US005229652A

United States Patent [19]
Hough

[11] Patent Number: 5,229,652
[45] Date of Patent: Jul. 20, 1993

[54] NON-CONTACT DATA AND POWER CONNECTOR FOR COMPUTER BASED MODULES

[76] Inventor: Wayne E. Hough, 1005 8th St., Mukilteo, Wash. 98275

[21] Appl. No.: 870,887

[22] Filed: Apr. 20, 1992

[51] Int. Cl.$^5$ .................. G06F 13/38; H01F 23/00
[52] U.S. Cl. .................. 307/104; 336/184; 336/200; 336/215; 336/226; 364/935.1; 235/380
[58] Field of Search .............. 307/17, 104; 336/115, 336/117, 119-129, 184, 214, 215, 200, 226, 232; 323/308, 331; 361/139, 142; 335/299; 333/179, 180; 235/380, 449; 364/900 MS File; 365/65-70

[56] References Cited

U.S. PATENT DOCUMENTS

| | | | |
|---|---|---|---|
| 4,146,781 | 3/1979 | Machate | 235/439 |
| 4,473,825 | 9/1984 | Walton | 340/825.54 |
| 4,480,178 | 10/1984 | Miller, II et al. | 235/380 |
| 4,506,148 | 3/1985 | Berthold et al. | 235/380 |
| 4,546,241 | 10/1985 | Walton | 235/380 |
| 4,600,829 | 7/1986 | Walton | 235/439 |
| 4,605,844 | 8/1986 | Haggan | 235/380 |
| 4,650,981 | 3/1987 | Foletta | 235/449 |
| 4,692,604 | 9/1987 | Billings | 235/493 |
| 4,720,626 | 1/1988 | Nishikawa | 235/449 |
| 4,758,836 | 7/1988 | Scuilli | 340/870.31 |
| 4,791,285 | 12/1988 | Ohki | 235/449 |
| 4,795,898 | 1/1989 | Bernstein et al. | 235/487 |
| 4,797,541 | 1/1989 | Billings et al. | 235/449 |
| 4,798,322 | 1/1989 | Berenstein et al. | 235/487 |
| 4,814,595 | 3/1989 | Gilboa | 235/492 |
| 4,818,853 | 4/1989 | Ohta et al. | 235/492 |
| 4,868,373 | 9/1989 | Opheij et al. | 235/380 |
| 4,953,123 | 8/1990 | Takeuchi et al. | 365/66 |
| 5,015,834 | 5/1991 | Suzuki et al. | 235/493 |

OTHER PUBLICATIONS

Translated patent abstracts from: Great Britain 2149548 (Jun. 12, 1989), PCT WO8404612 Nov. 22, 1984, German DE3490220 (May 30, 1985), PCT WO8706746 (Nov. 5, 1987), Canadian CA 1230436 (Dec. 15, 1987), Japan 60231286 (Nov. 16, 1985), EPO 267085 (May 11, 1988), France 2583538 (Dec. 19, 1986), Netherlands 8402968 (Jun. 3, 1985), and German 3530217 (Feb. 27, 1986).

J. Moddy, J. Foley, Contactless Coupling for Power and Data, Goddard Space Flight Center, NASA Technical Briefs, Sep. 1988 (page not known).

Nippon LSI Co., Ltd.: marketing and technical information regarding contactless memory cards (no date or product number).

*Primary Examiner*—A. D. Pellinen
*Assistant Examiner*—David Osborn
*Attorney, Agent, or Firm*—Graybeal Jackson Haley & Johnson

[57] ABSTRACT

The invention discloses a non-contact way to provide electrical power and two-way digital communications between a host computer and its peripheral modules, such as IC memory cards, modems, and A/D converters. A special magnetic core is employed to provide efficient transfer of both large amounts of electrical power and high speed digital communications through transformer action. Peripheral modules requiring different power supply voltages or different data voltage levels can be accommodated and intermixed with modules of other types in the same host system. The mechanical design of the connector includes detent structure to align the assembly in three dimensions, both upon mating, and under mechanical environmental stress conditions during operation. The magnetic core has both power supply and data windings; the data winding has sections of opposite polarity so that the power supply signal imposed on the data winding cancels itself.

21 Claims, 7 Drawing Sheets

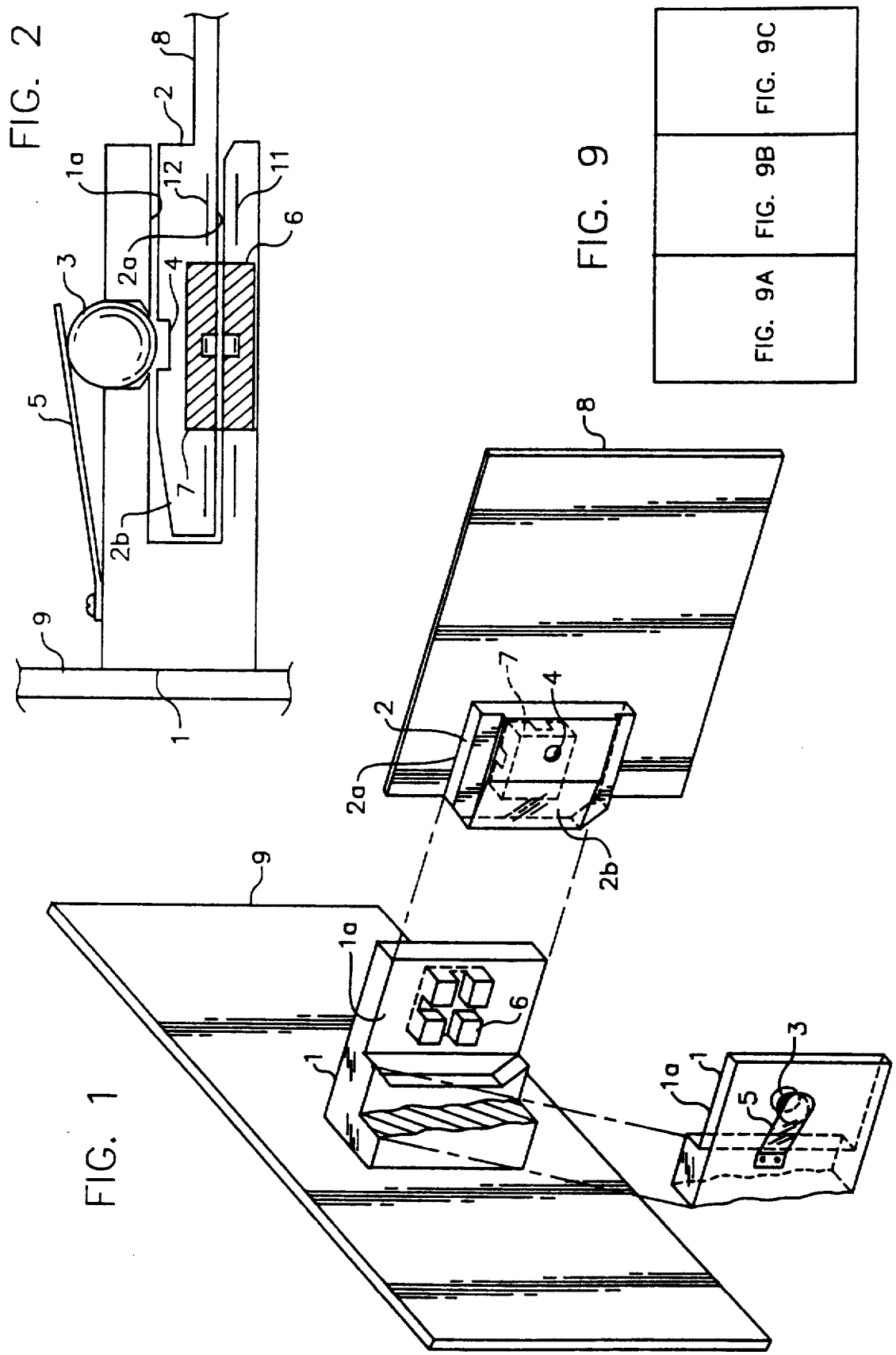

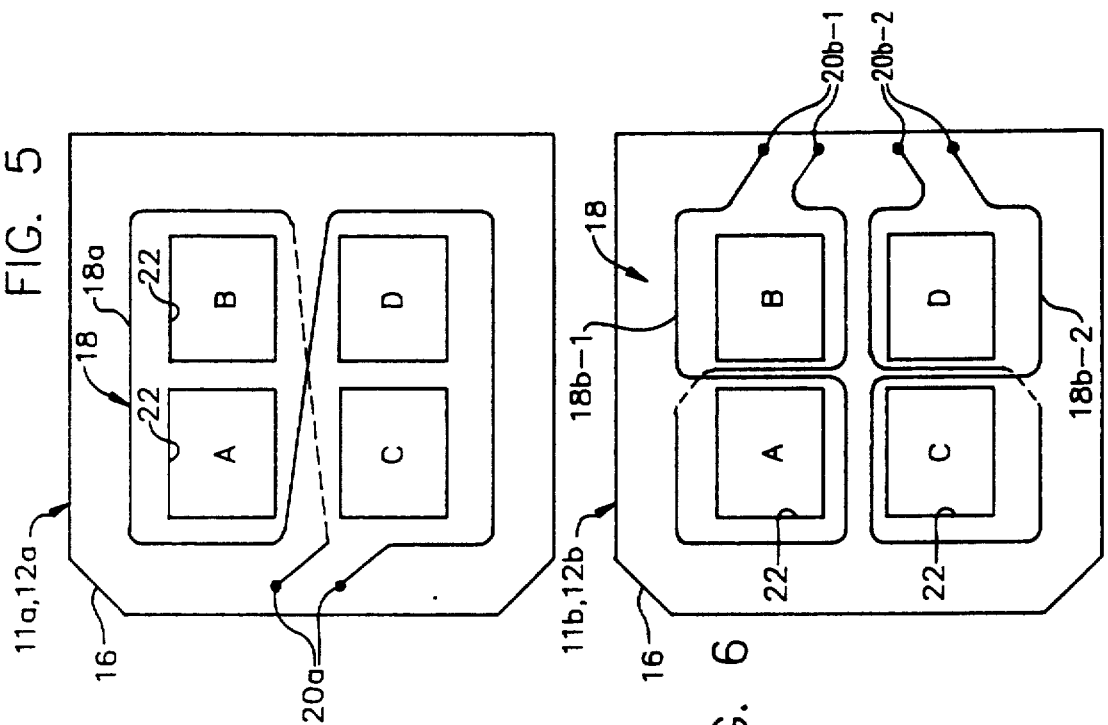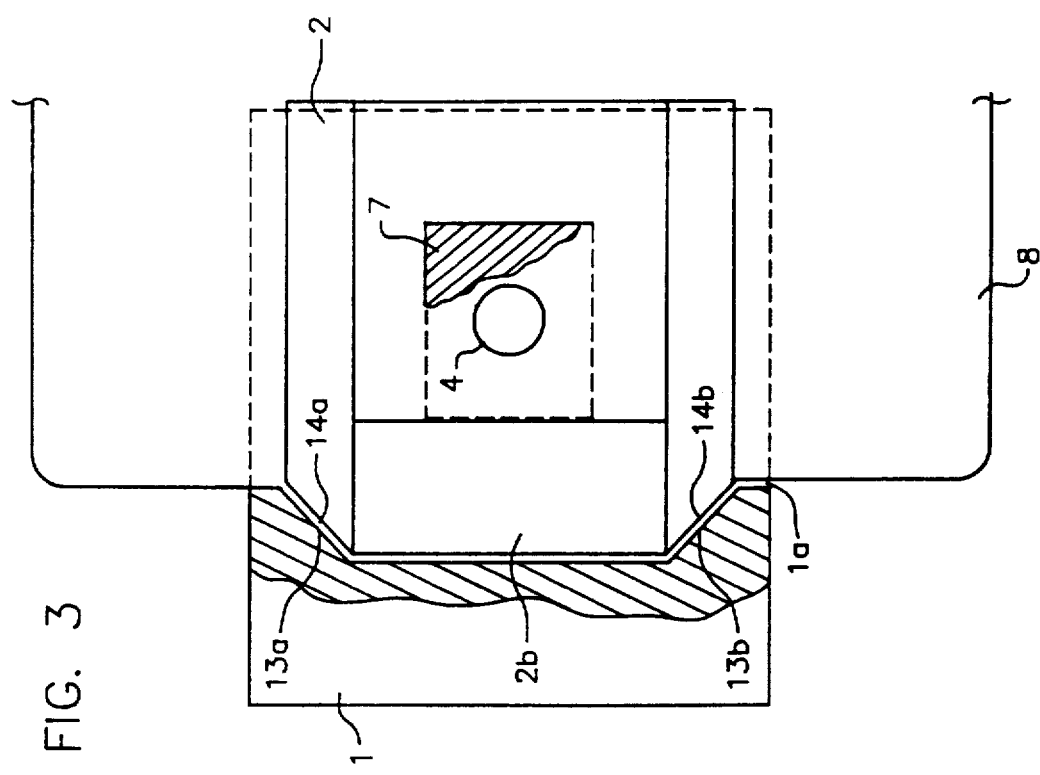

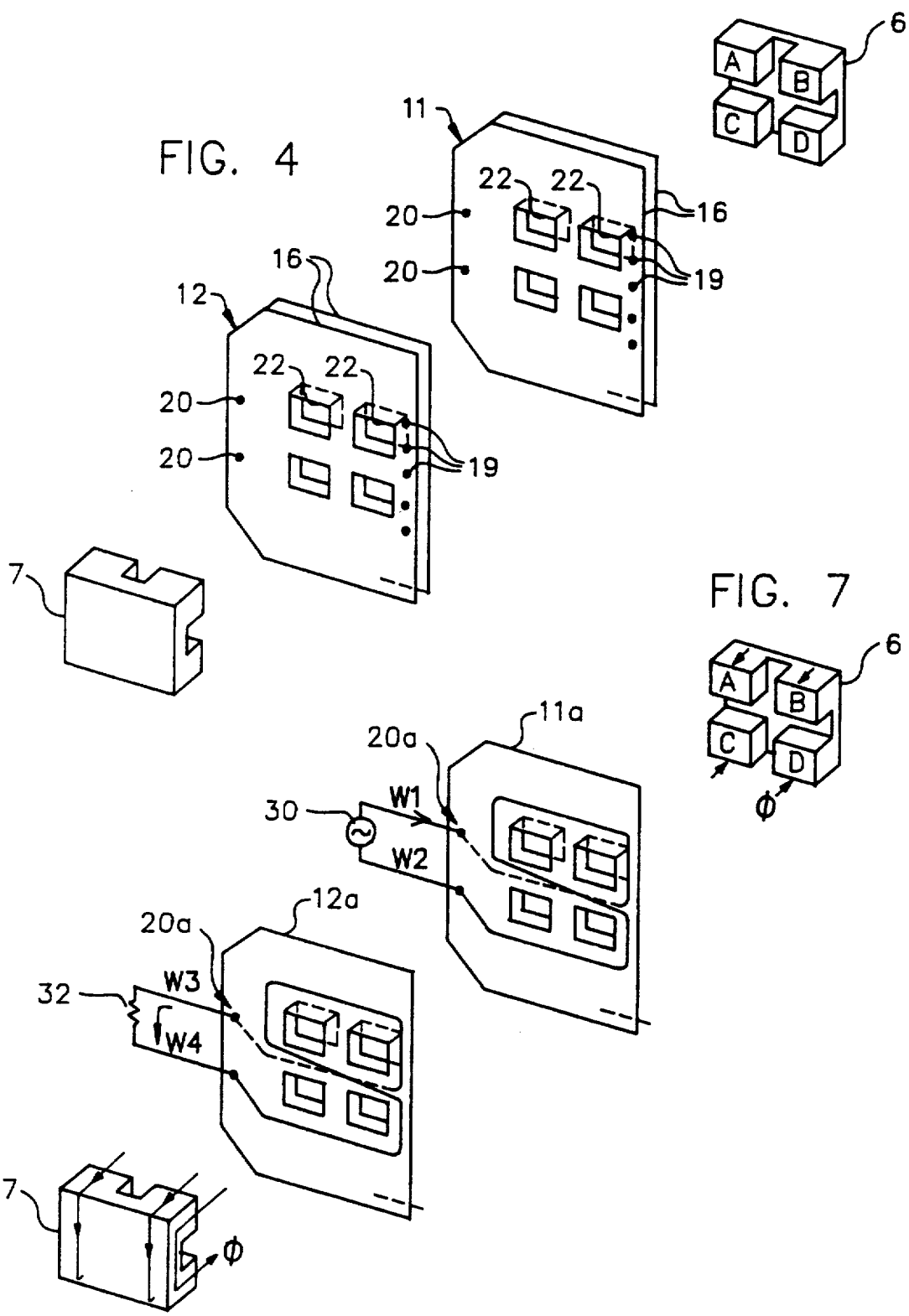

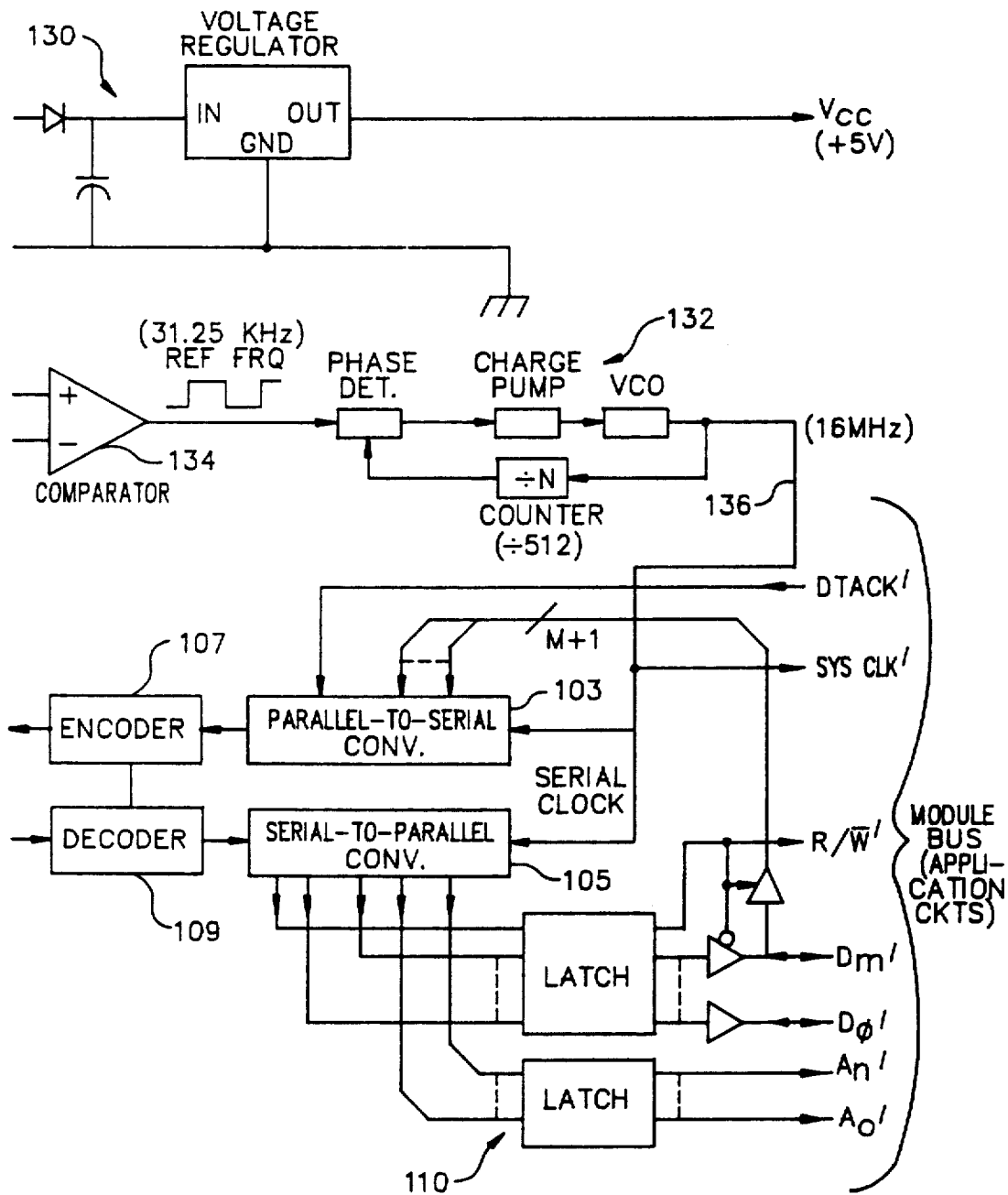

NON-CONTACT DATA AND POWER CONNECTOR FOR COMPUTER BASED MODULES

BACKGROUND OF THE INVENTION

The invention relates to the area of plug-in computer modules, particularly for application to laptop, notebook, or other portable computer products where small size, power conservation, and harsh environment such as shock, vibration, and temperature are important considerations.

Conventional computer packaging architectures typically employ a backplane, consisting of an array of identical multipin connectors wired in a parallel bus configuration to the power supply, address, data, status, and control signals from the host computer. Peripheral cards, or modules, such as IC memory, having mating multipin connectors, can be plugged-in to the backplane positions, and thus communicate with the host computer.

A number of problems arise as a result of this scheme, including:

Current 32-bit computers require a very large number of pins—for the backplane connector, typically 96 pins or more. The parallel bus method makes the connector expensive, power and board-area hungry, and design-difficult due to high-frequency cross talk, reflection, and termination problems of the backplane traces.

Large multi-pin connectors have serious environmental constraints and are particularly sensitive to shock, vibration, contamination, and wide ambient temperature exposure.

In applications where frequent module insertion and extraction is needed, as for example, IC memory cards, the high mating force resulting from the large pin count is an ergonomic drawback. The wear of the contacts is also a problem, and leads to eventual unreliability of the connection.

The number of pins on the connector determines the maximum address size, so that expansion of the design is limited. A 64-bit processor, for example, would require a 64-bit address and data scheme, and therefore twice as many pins as a 32-bit processor.

Since the host power supply is used by plug-in modules, there is no ohmic isolation of the circuitry. This can result in ground loops, noise, and other problems with modules used for analog functions. In the case of medical instrumentation, there is no inherent isolation of the patient from the circuitry.

The power supply voltages available to the module circuitry are those defined by the host. In VME bus systems, for example, +5 logic and ±12 volt supplies are used. Many new types of integrated circuits require still different voltages or other supply specifications such as very tight voltage regulation.

The logic levels for the backplane signals must be carefully specified and identical for all modules. Thus, TTL signal levels are different from CMOS signal levels, even when both circuits use the same +5 power supply. Furthermore, recently adopted 3 volt logic ICs cannot interface directly, nor can mixed 5 volt and 3 volt systems be implemented easily.

These problems and others can be minimized or eliminated by replacing the connector function with a design using non-contact technology. This general concept has been previously attempted for so-called "Smart Cards" used in financial and transaction-oriented markets. Various physical effects, including capacitive, inductive, hall effect, and optical coupling have been proposed for data and/or power transfer. To date, however, the technology has not allowed for efficient transfer of large amounts of power, nor the capability of very high data rates. Furthermore, "Smart Card" concepts generally use a major portion of the surface area of the card for the elements of the non-contact connection, and thus are not in a form suitable as a compact low-insertion force connector that is a separate element from the card or module. A separate or discrete non-contact connection scheme would offer universal application to many different module host designs. Examples of these prior efforts are found in U.S. Pat. Nos. 4,480,178; 4,605,844; 4,650,981; 4,692,604; 4,720,626; 4,791,285; 4,795,898; 4,797,541; 4,798,322; and 5,015,834.

SUMMARY OF THE INVENTION

A non-contact power and data connector is provided for coupling a removable electronic module with a host device. The connector includes a host transformer core part and a module transformer core part, each having multiple poles that mate when the module is installed on the host device. Associated with the core parts and arranged with respect to the multiple poles of each core part are power windings and data windings. The power windings are arranged on the core part so as to couple alternating current power between module and host through certain flux paths of the mating poles of the transformer core parts, and the data windings are arranged on the core parts to couple data between the module and host device in flux paths different than those used for power. The power and data windings on the module core part and the host core part are so wound in relation to one another and to the poles that power flux in the transformer core parts is mutually cancelled in the data windings and data flux is mutually cancelled in the power windings. Hence, the transformer core parts and the associated power and data windings form an integrated power and data magnetic transformer structure that efficiently couples power and data using a common transformer core structure formed by the module and host core parts when the module is installed in the host.

In a preferred embodiment of the invention, the module core part and the host core part each have four poles arrayed in quadrants symmetrical about a central axis. Each set of mating poles provides a flux path for the power and data windings. Detent means are provided for removably holding the module and host transformer core parts together in the mated pole relation when the module is installed on the host. The power flux path uses two sets of mated poles to form a complete magnetic flux consisting of two parallel flux circuits coupling a primary power winding on the host core part with a secondary winding on the module core part. The data windings are arranged on the respective core parts so that two sets of data windings are used for bidirectional coupling. One set of data windings is associated with a flux path that uses one-half of the mated core parts with flux encircling two of the four sets of mated poles. The other data windings couple data through the other half of the core structure by a flux path traversing the other set of mated core poles. Power flux is mutually cancelled in both sets of data windings.

In a still further preferred embodiment, the data windings of the module and host are each connected to interface electronics which, for transmitted data, includes a parallel-to-serial converter followed by an encoder connected to the primary data winding. For data received, a decoder is connected to the secondary data winding for applying decoded data to a serial-to-parallel converter. Latches are provided at the output of the serial-to-parallel converter in the module for received data to be used as needed by the module application.

Another aspect of the preferred embodiment disclosed herein is the use of programmable, synthesized alternating current frequency generation in the power source circuit that is coupled to the power primary winding of the host. Phase-lock circuitry connected to the secondary power winding in the module locks a secondary clock signal to the primary frequency. The module clock signal governs the clock time of the interface circuitry of the module, and by phase-locking it to the frequency of the power alternating current, the module interface circuitry is uniquely and efficiently synchronized to the host interface circuitry.

In still another aspect of the invention, an alternative embodiment provides for multiple secondary power windings in the module in order to accommodate different power supply voltage requirements. The module section uses the same magnetic core structure and is powered by a common primary winding on the host core part.

These and further features, objects, and advantages of the invention will become apparent to those skilled in the art from the following detailed description and appended drawings.

To provide a complete disclosure of the invention, reference is made to the appended drawings and following description of preferred and alternative embodiments.

BRIEF DESCRIPTION OF THE DRAWINGS

FIG. 1 is an exploded view of the non-contact power and data connector of the invention for coupling a removable electronic module with a host device and illustrating the module core part and in a break-away view, the host core part.

FIG. 2 is a cross-section view taken in a plane passing perpendicularly to the interface between the core parts when in mated configuration and with the module installed on the host and illustrating the ball detent that holds the core parts securely in the pole-to-pole mated flux-coupling position.

FIG. 3 is a top plan view of the mated transformer core parts when the module is installed on the host device partly cut away for clarity.

FIG. 4 is an exploded view showing the module and host core parts and illustrating the symmetrical arrangement of the four poles of each core part in quadrants symmetrical to an imaginary center line passing perpendicularly to the interface plane at which the pole faces mate, and showing the printed circuit wafers for the data and power windings encircling openings into which the poles of the core parts are inserted to complete each half of the transformer structure.

FIG. 5 is an enlarged view of the power winding printed circuit showing the arrangement of the power winding about the four poles of the magnetic core structure A, B, C and D.

FIG. 6 is a view similar to FIG. 5 showing an enlarged plan view of the data winding printed circuit with first and second data windings looping around the sets of magnetic poles A, B for one of the data windings and C, D for the other data winding.

FIG. 7 is a diagrammatic view showing the power flux and associated power currents of the core parts and primary and secondary windings.

FIGS. 9A, 9B, and 9C are together a complete detailed schematic diagram of the transformer power and data windings of the completed non-contact connector and associated power supply and interface circuitry of a host-module system.

DESCRIPTION OF THE EMBODIMENTS

Figure 8:
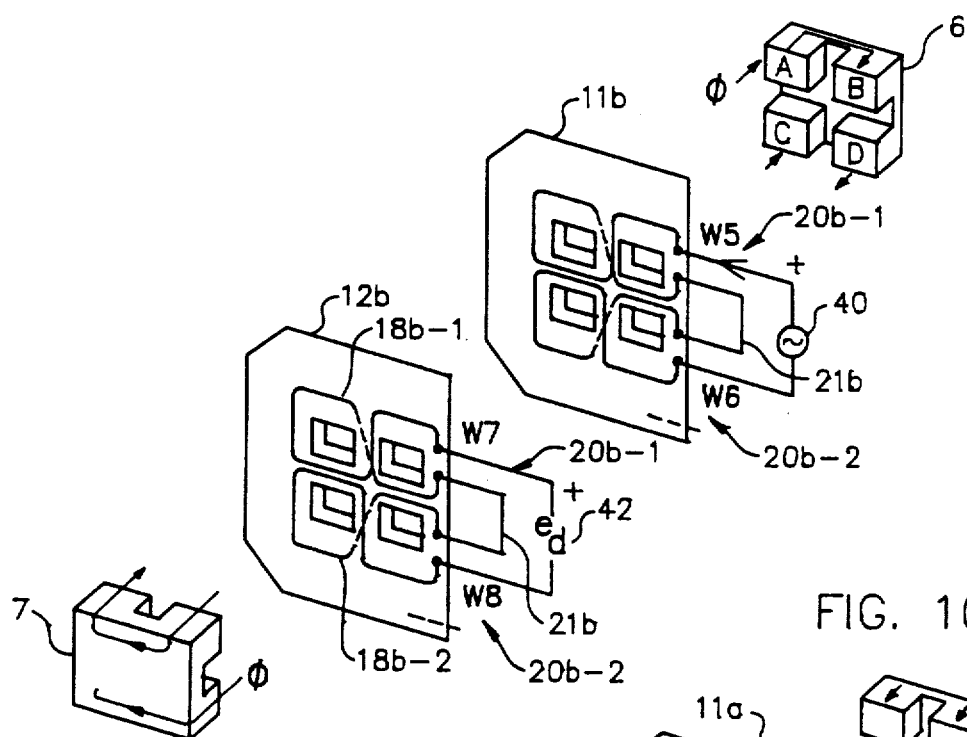
FIG. 8 is a similar diagrammatic view of the transformer core parts and data windings showing flux paths and data currents associated with coupling of data in one channel (one direction) only.

FIG. 1 illustrates a typical computer peripheral module 8 connected to a typical host backplane 9. The module 8 is fitted with a non-contact connector housing 2 which contains one-half of a transformer-coupling arrangement, represented in this figure by the module core 7. The host backplane 9 has affixed thereto a core housing 1 which matingly accepts the module housing 2 and contains the other half of the transformer-coupling arrangement including a host core 6. Host core 6 and module core 7 constitute core parts, each having multiple poles that when brought together in pole-to-pole mated relation, as shown in FIG. 3, form a complete transformer core structure having multiple flux parts.

Each half of the core structure is a rectangular block of magnetically permeable material such as ferrite, of thickness substantially less than a side dimension so as to have a small aspect ratio for embedding the module core 7 in a thin card or similar structure. Formed from the ferrite block are four poles A,B,C and D located in quadrants disposed symmetrically to a center axis passing perpendicularly through the core major face. The resulting pole segments are individually of rectangular shape in a plane parallel to the major faces and extend in depth about one half of the original thickness of the ferrite block. The end faces of the pole segments are coplanar so that when the core halves are brought together the mating poles contact and efficiently conduct flux between the core bodies.

As shown in FIG. 2, the housing 1 on the host is a regular polygon of non-magnetic material and is provided with a slot 1a extending from one unsupported end parallel to the exterior faces of the housing for receiving insertion of the complementary module housing 2 of like material. Host core 6 is affixed within one wall of housing 1 with the multiple poles A, B, C, D, described in more detail herein, facing inwardly toward the slot 1a. Module core 7 is embedded in module housing 2 so that the multiple poles A, B, D, D thereof are flush with a lower housing surface 2a as shown in FIG. 2, and thus in position to slideably mate with the poles of host core 6. A ramp 2b on the top of the module housing 2 engages a detent ball 3 held in host housing 1 under leaf spring 5, forcing the ball upward away from core 7 as the module housing 2 is inserted into host housing slot 1a. When mating is achieved, the detent ball drops into socket 4 formed on the upper wall of housing 2.

Detent ball 3 is located over the center of the transformer cores 6 and 7, and thus presses them together so that the mating sets of poles A, B, C and D engage face to face to provide optimum magnetic flux coupling and hence reliable electrical power and data transmission.

FIG. 3 is a top view of the mated module and host transfer sections. Alignment of the two cores 6 and 7 is assured by lands 13 and 14 on housings 1 and 2, respectively, which are disposed at 90° to each other and 45° to the backplane in this case, and located so that the force from the detent ball 3 presses the module housing 2 and affixed core 7 into the host housing 1 and its embedded core 6 along force vectors between the center of the ball and the midpoints of lands 13a–14a and 13b–14b. The action of the spring-biased detent ball 3 thus acts to align the magnetic cores 6 and 7 in three axis and hold the pole faces securely together.

FIG. 4 illustrates an exploded view of the transformer coupling for a typical host/module non-contact connection. The power and data windings are implemented by multilayer printed circuits 11 and 12, respectively. Each printed circuit 11,12 has an insulator wafer 16, printed conductor windings 18 (see FIGS. 5 and 6), and terminals 19,20 both for external connections to power and data interface circuitry and when required for joining windings segments on adjacent wafers in selected multi-turn configurations. Apertures 22 are sized and placed for fitting over the four pole segments A, B, C and D of the respective transformer half cores 6 and 7.

FIG. 5 shows the winding configuration for the power windings 18 including a turn 18a around pole segments A,B and a turn 18b around pole segments C,D. The host and module windings on printed circuits 11,12 are thus identical in this instance. Connection to power circuitry of host and module is provided at power terminals 20a.

FIG. 6 shows the winding configuration for data on printed circuits 11b and 12b, which are also identical in this case for host and module sections. A pair of data windings 18b-1 and 18b-2 are provided, one encircling pole segments A,B in opposite directions, and the other data winding 18b-2 encircling pole segments C,D in opposite directions. Connections of coupled data to interface circuitry is at terminals 20b-1 and 20b-2.

The power transformer function is illustrated in FIG. 7. When the primary is excited by an AC source voltage 30 at power terminals 20a (w1 and w2) of the host printed circuit 11a, an AC magnetic flux is created which couples energy to the secondary winding on printed circuit 12a at terminals 20a (w3 and w4). The flux $\phi$ is in one direction for poles A and B as indicated, and returns with opposite flux sense for poles C and D. Terminal 20a (w3) is thus of the same electrical polarity as terminal 20a (w1).

From the power winding standpoint, therefore, the magnetic transformer circuit can be thought of as two magnetic paths in parallel, path A-C and a parallel magnetic path B-D.

The data transformer function is illustrated in FIG. 8. When the primary printed circuit 11b is excited by an AC voltage 40 at terminals 20b-1 and 20b-2 (w5, w6), flux $\phi$ is produced in pole segments A,B and pole segments C,D which couples the primary to the secondary terminals 20b-1 and 20b-2 (w7–w8). Jumpers 21b and the sets of primary and secondary windings establish a pole winding configuration that causes the data flux to flow in one direction for poles A and C, and the opposite direction for poles B and D as shown by arrows. The flux paths thus define two parallel equal flux paths A-B and C-D. The secondary data voltage $e_d$ appears at 42.

Although the power and data windings share a common magnetic structure in core halves 6 and 7, there is no coupling of the power voltage into the data windings due to mutual flux-winding cancellation; for the same reason, the data signals produce no net voltage in the power circuit. Consider the secondary data winding 18b-1, 18b-2 between w7–w8. Net voltage is induced when flux is of opposite sense in poles A–B. The flux changes due to the power windings, however, are always such that poles A–B are in phase, i.e., same sense. This in-phase component, therefore, does not induce a net output voltage in the data winding 18b-1, 18b-2. 1

The same reasoning applies to the data signals affecting the power circuit. Since voltage is produced in winding 20a at w3–w4 (see FIG. 7) by flux $\phi$ of opposite polarity for poles A–C, any flux component that is in-phase will induce voltages that cancel, i.e., the two half-windings 18a between w3–w4 will have voltages of opposite polarity and hence cancel. As we have seen, it is precisely the case that the data windings always produce flux that is in-phase for poles A–C.

The direction of signal flow for the data windings can be either from primary to secondary, or secondary to primary. For bidirectional communication in this embodiment, each winding would be connected to bidirectional transceiver circuits 90 shown and described in connection with FIG. 9B (such as RS-485 interface devices similar to Texas Instruments SN75176A). In such case, the data section will be operated in half-duplex mode, with the direction of signal flow controlled by the host read/write signals.

Figure 9A:
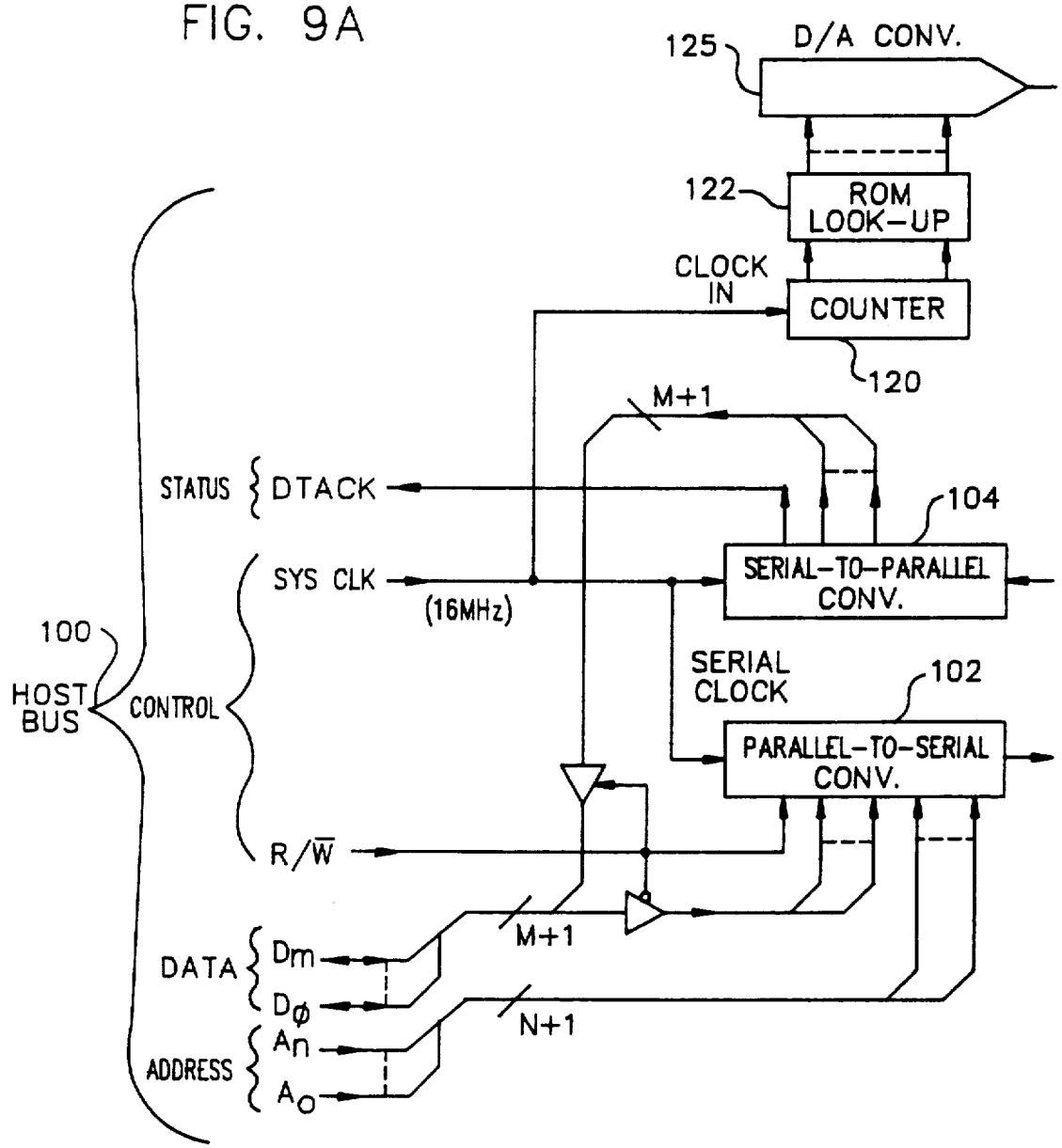
Figure 9B:
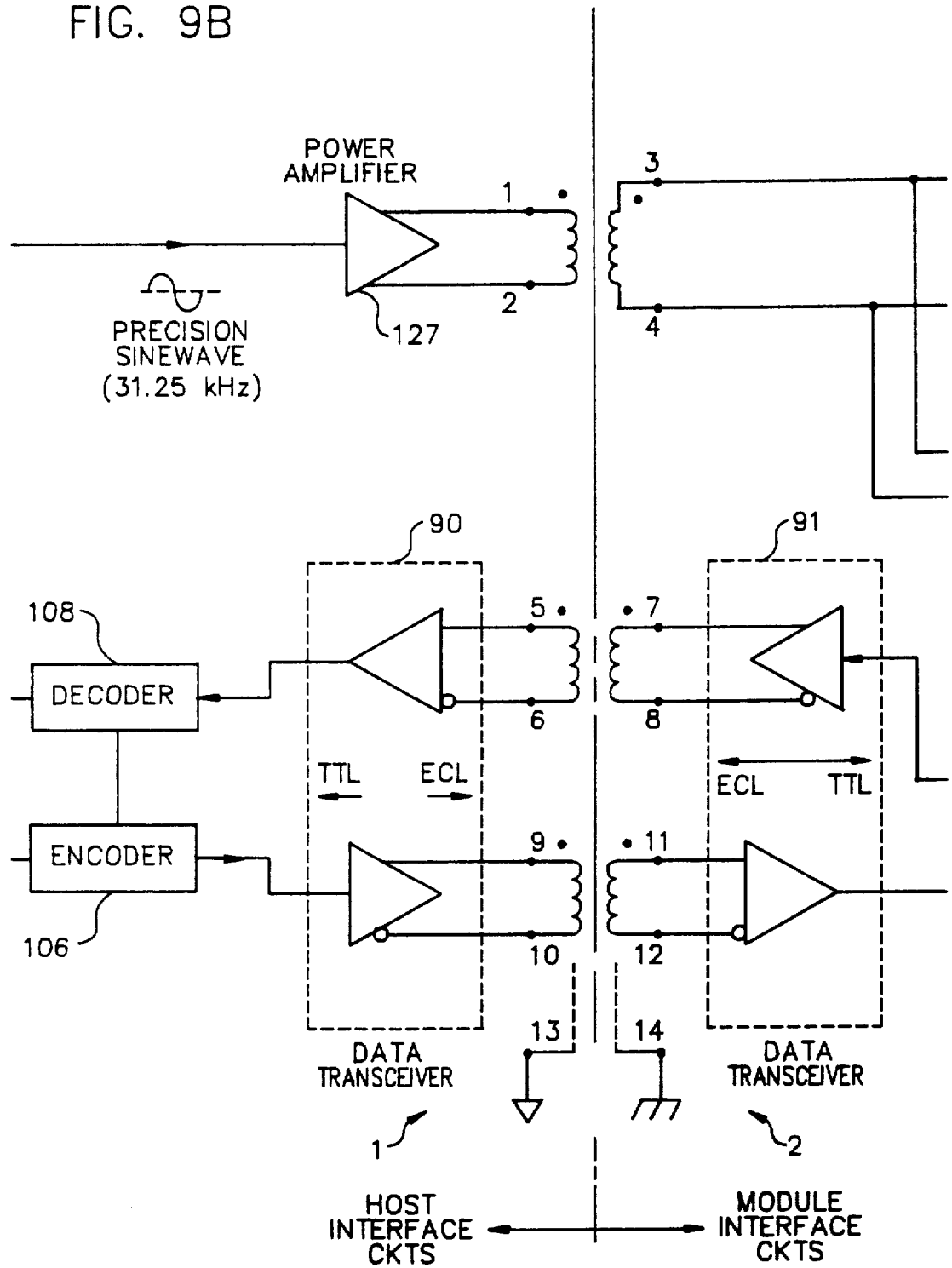

FIGS. 9A, 9B and 9C taken together illustrate typical power and data interface system employing the invention. On FIG. 9A, parallel data signals on the host backplane bus 100, including address, data, status, and control are connected to a parallel-to serial conversion circuit 102 for transmission to the module, while data signals from the module are converted by a serial-to-parallel conversion circuit 104 to allow the host to read them on the host bus 100.

An encoder 106 (FIG. 9B) converts the serial data to an appropriate code that removes the D-C content before transmission through the data transformer. A suitable code is Manchester II, which has the characteristic that each bit time has a high-to-low or low-to-high transition at the bit midpoint. Each bit is thus a pulse, which can be transformer coupled. Another coding scheme that can be used is 4B/5B, a method that is employed by FDDI (a fiber optic data standard). Returning data from module 8 is coupled by the transformer and then decoded by complementary decoder 108 prior to serial-to-parallel conversion. On the module side of the transformer (FIG. 9C), a bidirectional transceiver circuit 91, encoder 107, decoder 109, parallel-to-serial converter 103 and serial-to-parallel converter 105 provide the complements of the above described host circuits. Latches 110 hold data and addresses after receipt and conversion in converter 105 for use by module 8 applications.

The result of the data interface system is that all host processing with the module functions the same as though the module was directly connected to the host backplane by contact connectors.

As shown in FIGS. 9A and 9B, preferred synthesized power signal is used to transmit power to the module through the non-contact transformer coupling. The system clock, or other reference, is used to synthesize a precision sinewave using a counter 120, ROM look-up table 122 and D/A converter 125, which is then applied to a power amplifier 127 that drives the primary power windings 11a. The voltage thus coupled to the module is rectified, filtered, and regulated at 130 (FIG. 9C) to provide supply voltage(s) $V_{cc}$ for the module 8 circuits. The power AC voltage is also uniquely used as a frequency and phase reference for the data circuits. Since the power frequency is derived from the system clock, the same clock used for transmission of data, there is thus an integer or phase relation between the power and data clock frequencies. A phase-lock loop 132 uses the power frequency extracted by comparator 134 as a reference in order to generate a data clock at lead 136 for the module data circuits.

In other applications, more than one data winding, i.e., additional circuit layers identical to FIG. 6, can be added to each printed circuit data winding. When two such data paths are used, the system can be operated with one winding pair connected to the read path and one to the write path.

The data windings can have different numbers of turns for primary and secondary. An example would be the case when the module uses 3 volt logic but must connect to a host using 5 volt logic. In this case, the secondary data winding, or windings, would have fewer turns so that host write signals would be stepped down to the module circuits, and host read signals would be stepped up from module to host.

The power transformer design is independent of the data section, and any conventional transformer design techniques can be applied. Typically, all designs will use an identical primary winding and primary excitation voltage in order to make all modules standard and allow intermixing of different module types within the same host system. The secondary windings can have different numbers of turns, taps, and outputs, as required by the module circuitry.

As an example, when flash memory devices are used on the module, one secondary winding can be used to provide a +5 volt logic supply, while a second winding provides a +12 volt programming voltage. Another example is the case of 3 volt logic on the module. In this case, a secondary with fewer turns provides a 3 volt supply, rather than 5 volts.

Figure 10:
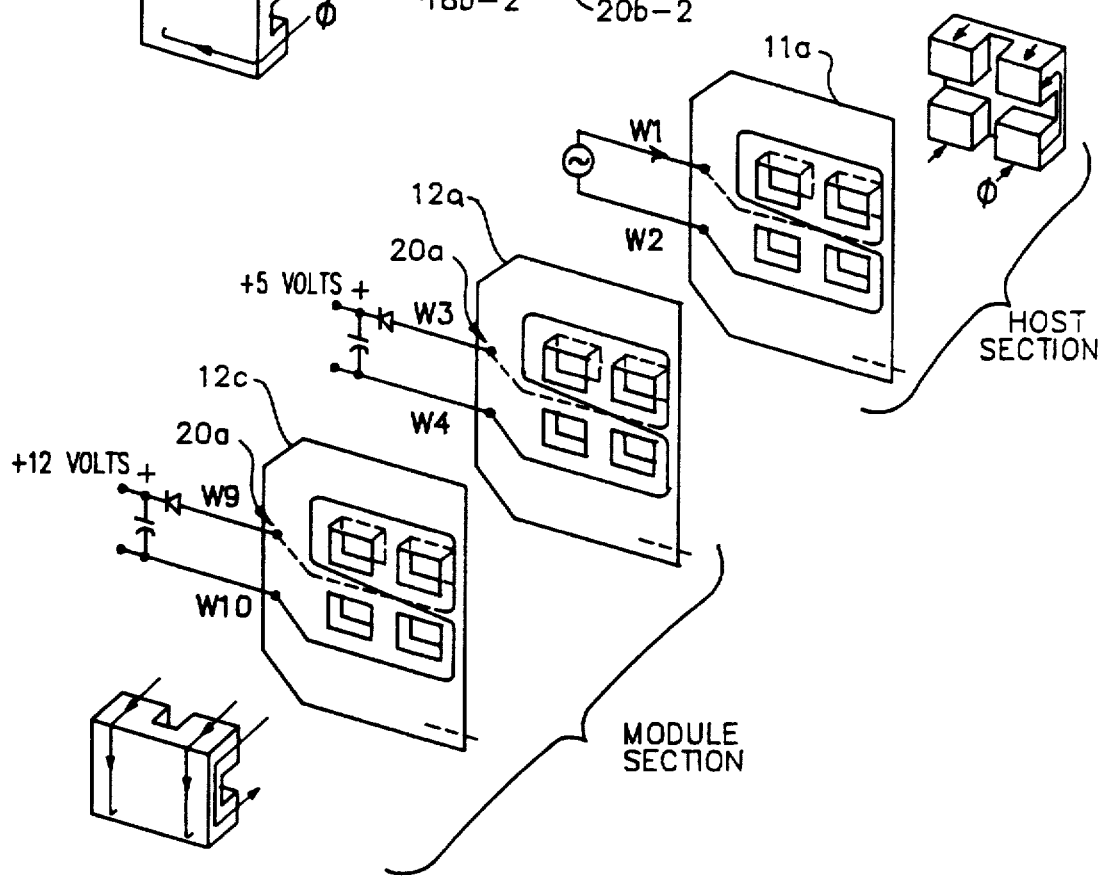
FIG. 10 is an exploded view similar to FIG. 7 illustrating an alternative embodiment of the invention for providing multiple and different supply voltages in the module section of the non-contact connector by using multiple secondary printed circuit cards in the module section of the transformer connector powered by a single common primary winding printed circuit card in the host section of the non-contact connector.

FIG. 10 illustrates the power windings for a module requiring multiple supply voltages. The primary winding 11a is the same as for all other modules on the same host backplane. An additional secondary winding 12c is provided. This printed circuit is of the same form as winding 12a but has more turns such as twice that of winding 12a, in this case to supply a +12 v module power supply. From the magnetic standpoint, the conductors in winding 12c are excited by exactly the same AC power flux as those for winding 12a, and therefore have exactly the same voltage per turn induced in them. The transformer does not "know" (or care) how the turns are actually connected in the circuit. This same principle can be extended to alternative configurations having more power supplies, supplies having negative output voltages, and other requirements.

While particular embodiments of the invention have been shown and described, it will be apparent to those skilled in the art that changes and modifications may be made without departing from the invention in its broader aspects, and therefore, the intent in the appended claims is to cover all such changes and modifications as fall within the spirit of the invention.

What is claimed:

1. A non-contact power and data connector for coupling a removable electronic module with a host device, comprising:
   a first transformer core part having multiple poles and being adapted for mounting on a host device;
   a second transformer core part having multiple poles and being adapted for mounting on a removable electronic module, said multiple poles of said first and second transformer core parts being configured to mate;
   a first power winding means on said first transformer core part for causing power flux to traverse through certain of said poles of said first and second transformer core parts;
   a second power winding means on said second transformer core part for coupling with said power flux;
   a first data winding means on said first transformer core part for coupling to data flux traversing through certain of said poles of said first and second transformer core parts; and
   a second data winding means on said second transformer core part for coupling with said data flux, said first and second data winding means being so wound in relation to said poles and said first and second power winding means that said power flux mutually cancels in those poles that couple data flux between said first and second data winding means.

2. The non-contact power and data connector of claim 1 wherein each of said first and second transformer core parts have at least four said poles.

3. The non-contact power and data connector of claim 2 further comprising third and fourth data winding means on said first and second transformer core parts respectively, said first and second data windings being wound to cause one data flux path using a one set of said four mating poles; and said third and fourth data winding means being wound to cause another data flux path using the other set of mating poles, said power flux self-cancelling in said first and second data winding means and in said third and fourth data winding means.

4. The non-contact power and data connector of claim 3 wherein said pairs of mating poles are juxtaposed.

5. The non-contact power and data connector of claim 4 wherein said juxtaposed pairs of mating poles are arranged in quadrants substantially symmetrical with a midpoint of said first and second transformer core parts.

6. The non-contact power and data connector of claim 5 further comprising detent means for removably holding said first and second transformer core parts with said poles in mating registration.

7. The non-contact power and data connector of claim 6 comprising host and module interface circuit means associated with said winding means for power and data coupling through power and data flux traversing through said mating poles of said first and second transformer core parts.

8. The non-contact power and data connector of claim 1 wherein said first and second transformer core parts have main body portions that complete magnetic paths through said mating poles, and wherein each of said poles of said first and second, transformer core parts have a face at which said mating poles mate, each of said pole faces being of an area that is greater than a cross-sectional area of said main body portions of said first and second transformer core parts so that some misalignment of the pole faces does not cause significant loss in flux density traversing mating poles.

9. The non-contact power and data connector of claim 1, further comprising:
mechanical means for causing said first and second transformer core parts to be positioned and held with said multiple pole in mating relation.

10. The non-contact power and data connector of claim 9 wherein said mechanical means comprises spring-loaded detent means for holding said first and second transformer core parts with their multiple poles in said mating relationship.

11. The non-contact power and data connector of claim 10 wherein said spring-loaded detent means comprises a spring-biased ball and a recess formed on one of said first and second transformer core parts opposite its poles for being engaged by said spring-biased ball to hold said multiple poles in said mating relationship.

12. The non-contact power and data connector of claim 1 wherein said multiple poles of said first and second transformer core parts each have a pole face that engages the pole face of a mating one of said poles, and said pole faces of said first transformer core part are coplanar and said pole faces of said second transformer core part are coplanar, and further comprising mechanical guide means for relative slidable guiding of said first and second transformer core parts along a direction that includes a component parallel to said pole faces, and spring-loaded detent means for biasing said first and second transformer core parts in a direction having a component perpendicular to the pole faces for holding said pole faces in engaged mating relation.

13. The non-contact power and data connector of claim 1, further comprising host interface electronic means including alternating current power signal means and data encoder-decoder means.

14. The non-contact power and data connector of claim 1, further comprising module interface electronic means including power rectifier means, and data encoder-decoder means.

15. The non-contact power and data connector of claim 7 wherein said host and module interface circuit means each comprise data encoding and data decoding means.

16. The non-contact power and data connector of claim 15 wherein said data encoder and data decoder means comprise means for conversion between serial and parallel data.

17. The non-contact power and data connector of claim 1 comprising alternating current power source means including means for receiving and converting a periodic clock signal into a sinewave primary power signal that is applied across said first power winding means.

18. The non-contact power and data connector of claim 17, further comprising power rectification and filtering means connected to said second power winding means, and comparator means connected to said secondary power winding means for extracting thereat a secondary timing signal representing said sinewave primary power signal, and phase-lock means for coupling said secondary timing signal representing said sinewave primary power signal to said electronic module for synchronization thereof.

19. The non-contact power and data connector of claim 5 wherein said first and second power winding means and said first and second data winding means are symmetrically wound on said poles so as to minimize electromagnetic radiation from said connector.

20. A non-contact power and data coupling for a removable electronic module connected with a host device, comprising:
first and second transformer core parts having multiple poles and being adapted for mounting on a host and module respectively, so as to cause said multiple poles to mate;
primary and secondary power winding means on said first and second transformer core parts, respectively, for causing power flux to traverse through certain of said mated poles of said first and second transformer core parts;
primary and secondary data winding means on said first and second transformer core parts, respectively, for causing data flux to traverse through certain of said mated poles of said first and second transformer core parts; and
said data winding means being so wound in relation to said poles and said power winding means that said power flux mutually cancels in those poles that couple data flux between said primary and secondary data winding means.

21. A non-contact power and data connector for coupling a removable electronic module with a host device, comprising:
a first transformer core part having a main body portion and four protruding pole segments and being adapted for mounting on a host device;
a second transformer core part having a main body portion and four protruding pole segments and being adapted for mounting on a removable electronic module, said pole segments of said first and second transformer core parts being configured to engage in pole-to-pole mating relation;
a first power winding means on said first transformer core part for causing power flux to traverse through a first pair of mating pole segments in one direction and traverse through the other pair of mating pole segments in the opposite direction;
a second power winding means on said second transformer core part for coupling with said power flux when said core parts are in said pole-to-pole mating relation;
a first data winding means on said first transformer core part for coupling to data flux traversing in opposite directions through said first pair of mating pole segments and in opposite directions through said other pair of mating pole segments; and
a second data winding means on said second transformer core part for coupling with said data flux when said core parts are in said pole-to-pole mating relation, whereby said power flux mutually cancels in those poles that couple data flux between said first and second data winding means.

* * * * *